UNITED STATES PATENT OFFICE.

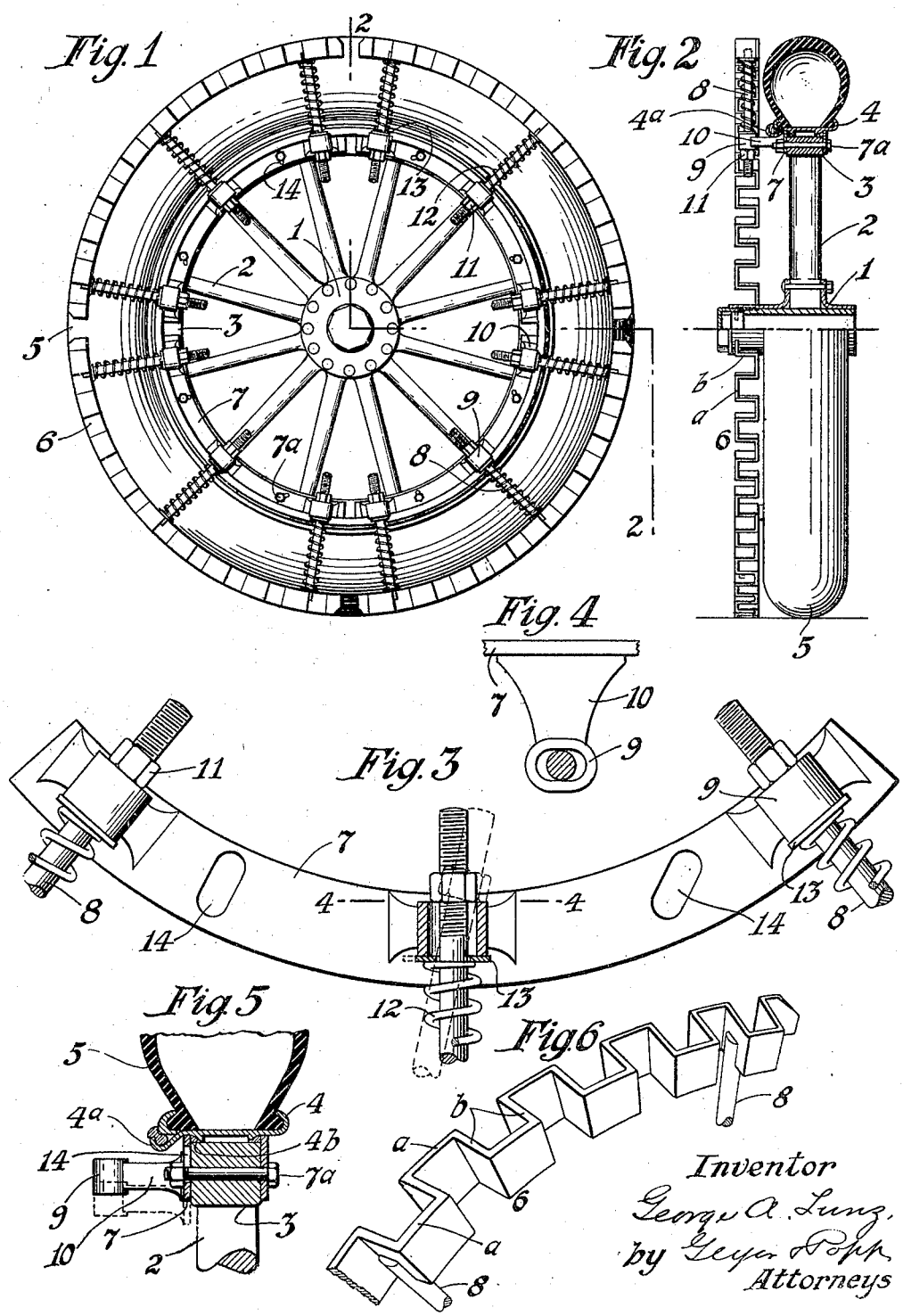

GEORGE A. LUNZ, OF BUFFALO, NEW YORK.

NON-SKIDDING ATTACHMENT FOR VEHICLE-WHEELS.

1,320,401.　　　　　Specification of Letters Patent.　　Patented Nov. 4, 1919.

Application filed March 14, 1919. Serial No. 282,530.

*To all whom it may concern:*

Be it known that I, GEORGE A. LUNZ, a citizen of the United States, residing at Buffalo, in the county of Erie and State of New York, have invented new and useful Improvements in Non-Skidding Attachments for Vehicle-Wheels, of which the following is a specification.

This invention relates to a non-skidding or safety attachment for vehicle wheels, and more particularly those of automobiles.

One object of the invention is the provision of a reliable and inexpensive device of this character which can be readily applied and removed, and which is supported separately from the tire, to avoid cutting or wear of the same by the attachment.

Another object is to so construct the attachment as to increase the traction of the wheel upon slippery pavements and roadways.

In the accompanying drawings:

Figure 1 is a side elevation of a vehicle wheel equipped with the improvement. Fig. 2 is a transverse section thereof on line 2—2, Fig. 1. Fig. 3 is an enlarged sectional elevation of one of the ring-sections and attached parts. Fig. 4 is a transverse section on line 4—4, Fig. 3. Fig. 5 is an enlarged cross section of the felly and adjacent parts. Fig. 6 is a fragmentary perspective view of the tread.

Similar characters of reference indicate corresponding parts throughout the several views.

1 indicates the hub, 2 the spokes and 3 the felly of a vehicle wheel. A rim 4, preferably of the demountable type, encircles the felly in the customary manner and carries a pneumatic or other suitable tire 5.

The safety attachment is arranged at the outer side of the wheel, and comprises a circular non-skidding tread or band 6 carried by a ring or annular frame 7 removably secured to the felly by transverse bolts 7ª or other appropriate fastenings. In its preferred form the band is composed of a suitable number of independently-yielding segments or sections each having a tread-edge of zig-zag sinuous or crenelate form, as shown, thus presenting non-skidding edges *a* running lengthwise of the band, and traction edges *b* extending crosswise of the band, which increase the traction of the wheel and prevent its slipping or spinning, especially on slippery pavements and roadways. These sections may be stamped or bent from strips of steel of appropriate dimensions, satisfactory results being obtained with strips about an inch in width and from one-eighth to one-fourth of an inch in thickness. In the drawings four tread-sections are shown, but a greater or less number may be employed, if desired.

Suitably secured to the tread-sections and extending inwardly therefrom, are radial rods 8, the inner portions of which slide in bearings 9 carried by lugs or brackets 10 projecting from the face of the ring 7, the rods being retained in the bearings by nuts 11 applied to their inner ends. Surrounding these rods are springs 12 which are interposed between the tread sections and washers 13 seated against the outer sides of the bearings 9. The resistance of the springs is such as to press the band-sections against the road or pavement and yet allow them to yield to stones, ridges or other obstructions, the springs serving to absorb any shocks received by the tread. Normally, adjacent sections are separated to the necessary extent to prevent their coming in contact with each other and being buckled when the vehicle is loaded. But notwithstanding this sectional construction, the tread band is practically continuous and does not therefore interfere with the easy riding of the car.

The rods 8 are preferably fitted loosely in their bearings, as shown in Fig. 4 and in connection with the middle bearing in Fig. 3, to allow the rods to rock to a limited extend in the plane of the supporting ring 7 and avoid undue strain on them in starting the vehicle. To that end, the bearings are slotted or elongated in the plane of the ring, but are sufficiently narrow to prevent lateral or transverse play of the rods, as seen in Fig. 4. A suitable number of such rods is employed to properly support the sections, three rods being provided for each section in the example illustrated in the drawings.

The supporting ring 7 is preferably composed of sections corresponding to those of the tread, so that the attachment as a whole is made up of sections or units each consisting of a tread-section, a ring-section and a number of connecting rods and springs. This sectional construction facilitates the application and removal of the attachment and also enables one or more parts to be renewed, if necessary, without requiring renewal of the entire attachment.

Ordinarily, two bolts 7ª are sufficient to fasten each ring-section to the wheel, but a different number may be employed if desired. In order to permit the ring-sections to pass under or behind the usual depressed flange 4ª of the demountable rim 4, each of the ring-sections is provided with parallel, obliquely arranged slots 14 for the passage of the fastening bolts 7ª. In assembling the parts, this slotted construction permits the ring-sections to be shifted on said bolts toward the axis of the wheel sufficiently to clear said depressed rim-flange, as shown by dotted lines in Fig. 5, and then to be shifted in the opposite direction sufficiently to overlap the customary beveled locking ring 4ᵇ of the demountable rim, as shown by full lines. These ring-sections thus perform the additional function of retaining said rim in place on the felly and dispense with the usual retaining lugs.

In practice, the tread-band is of substantially the same external diamater as the tire, gripping the roadway or pavement and yielding with the tire under the weight and vibrations of the vehicle. Being of sinuous or zig-zag outline, the tread presents two sets of gripping edges, one set resisting skidding and the other resisting spinning of the wheel and increasing its traction, as hereinbefore described, thus furnishing an effective safety attachment, which at the same time neither wears nor cuts the tire, as do non-skidding devices which cover or are applied to the tire-tread.

The cavities formed by the successive bends of the tread-band are open at their inner edges as well as their outer or tread-edges, and stones and other obstructions are therefore prevented from blocking or clogging the band.

I claim as my invention:

1. A non-skidding attachment for vehicle-wheels, comprising a supporting member adapted to be attached to the side of a wheel, and a tread-band of sinuous form carried by said member and arranged to bear edgewise against the pavement, the cavities formed by the bends of the tread-band being open and unobstructed both at their inner and outer edges and throughout the width of the band.

2. A non-skidding attachment for vehicle wheels comprising a supporting member adapted to be attached to the side of a wheel, and a tread-band carried by said member and consisting of a strip bent into crenelate form and arranged to bear edgewise against the pavement.

3. A non-skidding attachment for vehicle wheels, comprising a supporting member adapted to be attached to the side of a vehicle-wheel, a tread-band carried by said member and having a gripping edge of crenelate form, said band being composed of radially-movable sections guided on said supporting member, and resisting springs interposed between said sections and said supporting member.

4. A non-skidding attachment for vehicle wheels, comprising a supporting member adapted to be attached to the side of a vehicle wheel, a tread-band carried by said member and composed of radially-movable sections having non-skid edges, radially-sliding rods secured to said sections and guided on said supporting member, said rods being capable of rocking on said supporting member in the plane of the ring, but held from rocking in a plane at right angles to said ring, and springs for resisting the inward movement of the sections.

5. A non-skidding attachment for vehicle-wheels, comprising a supporting ring adapted to be attached to the side of a vehicle-wheel, said ring carrying an annular series of brackets having bearing-slots arranged in the plane of said ring, a tread-band composed of independent, radially-movable sections, said sections having guide-rods slidable in said bearing-slots, and said slots being sufficiently narrow to resist transverse rocking of said rods, and springs interposed between said brackets and said sections.

GEORGE A. LUNZ.

Copies of this patent may be obtained for five cents each, by addressing the "Commissioner of Patents, Washington, D. C."